United States Patent
Chen et al.

(10) Patent No.: US 10,735,682 B2
(45) Date of Patent: Aug. 4, 2020

(54) DRAM WITH STAGGERED WORD LINE TRANSITIONS FOR HYBRID-BONDED PHOTOSENSOR ARRAYS

(71) Applicant: OmniVision Technologies, Inc., Santa Clara, CA (US)

(72) Inventors: Chia-Ming Chen, San Jose, CA (US); Jong-sik Na, San Ramon, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 10 days.

(21) Appl. No.: 16/191,041

(22) Filed: Nov. 14, 2018

(65) Prior Publication Data

US 2020/0154073 A1  May 14, 2020

(51) Int. Cl.
*H04N 5/3745* (2011.01)
*H04N 5/378* (2011.01)
*H04N 5/376* (2011.01)

(52) U.S. Cl.
CPC ......... *H04N 5/37452* (2013.01); *H04N 5/378* (2013.01); *H04N 5/3765* (2013.01); *H04N 5/37455* (2013.01)

(58) Field of Classification Search
CPC ........... H04N 5/37452; H04N 5/37455; H04N 5/3765; H04N 5/378
See application file for complete search history.

(56) References Cited

U.S. PATENT DOCUMENTS

| 2007/0133338 | A1* | 6/2007 | Hoffmann | G11C 11/4082 365/233.18 |
| 2012/0069664 | A1* | 3/2012 | Kim | G11C 16/0483 365/185.11 |
| 2014/0077063 | A1* | 3/2014 | Cho | H01L 27/14634 250/208.1 |

* cited by examiner

*Primary Examiner* — Mekonnen D Dagnew
(74) *Attorney, Agent, or Firm* — Lathrop GPM LLP

(57) ABSTRACT

An image sensor has multiple blocks each with multiple pixels; each block uses a separate analog-to-digital converter (ADC). The ADCs feed digitized images into an image DRAM, and the image DRAM feeds digitized images to an alignment buffer in turn providing images to an image processor. The ADCs feed digitized image data into the image DRAM in hyperlong words, using staggered, overlapping, word lines to write each hyperlong word. A method of imaging includes exposing a photosensor array to light, reading pixels of the array in sequence within each block of pixels, one pixel in each block simultaneously; and digitizing pixels in separate ADCs for each block. Digitized pixels are written to image DRAM as hyperlong words with one pixel from each block in parallel using staggered, overlapping, word lines. Pixels are read from the image DRAM into an alignment buffer and thence to the image processor.

9 Claims, 7 Drawing Sheets

DRAM WITH STAGGERED WORD LINE TRANSITIONS FOR HYBRID-BONDED PHOTOSENSOR ARRAYS

BACKGROUND

Photosensor arrays may be associated with readout and raw-image storage circuits that provide data in a different order than the order of pixels within the array. For example, typically bond-per-pixel stacked-wafer photosensor designs have a pixel array die with pixels arranged in groups, with each group containing 8, 16, 32, or 64 pixels, each pixel of the group being read in sequence through an analog-to-digital converter (ADC) into a random-access memory (RAM) image memory on at least a second die. In some systems, the RAM may be Dynamic RAM (DRAM).

Word length of DRAM used for frame memory may be quite large. In a particular embodiment having an image sensor with 640×512 blocks, 64 pixels per block, having 640 blocks per row, at 12 bits per ADC, the width of writes for a single row may be 7680 bits. Since all 512 rows of a frame may write into the image DRAM simultaneously, the image DRAM of a particular embodiment may be written in 64 writes of 3,932,160 bits each, with each write including ADC data for a corresponding pixel of each block.

SUMMARY

An image sensor has an array of pixels configured in multiple blocks; each block coupled to a separate analog-to-digital converter (ADC) to provide digitized image data. The ADCs feed digitized images into an image DRAM; and the image DRAM feeds digitized images to an alignment buffer. Digitized images from the alignment buffer are provided to an image processor. In order to reduce current spikes, the image DRAM is written using staggered, but overlapping, word lines with each of group of DRAM blocks written using each of, or independent lines having timing of, the staggered word lines.

In embodiments, an image sensor has an array of pixels configured to sense light and configured in multiple blocks where each block of pixels feeds a separate analog-to-digital converter (ADC) to provide digitized image data. The ADCs feed digitized image data into an image dynamic random access memory (DRAM) in hyperlong words, the image DRAM using staggered word lines to write each hyperlong word. The image DRAM provides digitized image data to an alignment buffer that in turn provides digitized image data to an image processor. In particular embodiments, the image DRAM is read to the alignment buffer in words narrower than the hyperlong words with which the alignment buffer is written, and in some embodiments the array of pixels is on a pixel sensor integrated circuit die, and the image DRAM is on a second integrated circuit die.

In an embodiment, a method of forming a digital image and transferring the digital image to an image processor includes resetting and exposing a photosensor array to light for an exposure period; reading charge from pixels of the photosensor array in sequence within each of a plurality of blocks of pixels, reading charge from one pixel in each block of the plurality of blocks simultaneously; and digitizing the charge from pixels of the photosensor array in a separate analog-to-digital converter (ADC) for each block to provide digitized pixels. The digitized pixels are written as hyperlong words comprising one digitized pixel from each pixel block in parallel into an image DRAM using staggered, overlapping, word lines. Digitized pixels are read from the image DRAM into an alignment buffer; digitized pixels from the alignment buffer are provided to the image processor. In particular embodiments, reading digitized pixels into an alignment buffer uses narrower words than the hyperlong words with which the image DRAM is written. In particular embodiments, information read from the pixels of the photosensor array is transferred across a die boundary from a pixel sensor die to the ADCs in analog form.

DETAILED DESCRIPTION OF THE EMBODIMENTS

Figure 1:
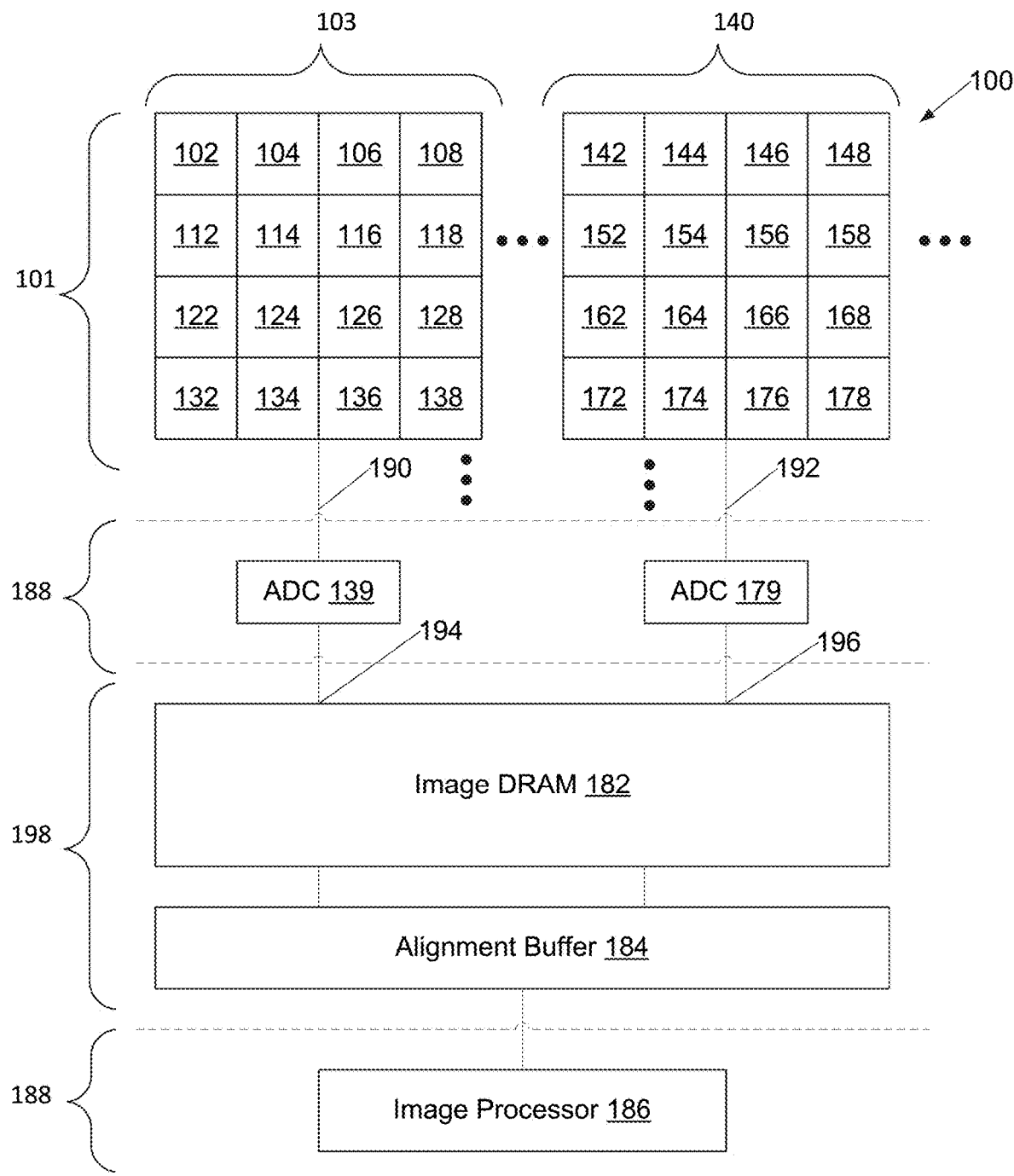
FIG. 1 is a block diagram of an image sensor with associated RAM image-buffer memory, alignment buffer, and image processor.
Figure 2:
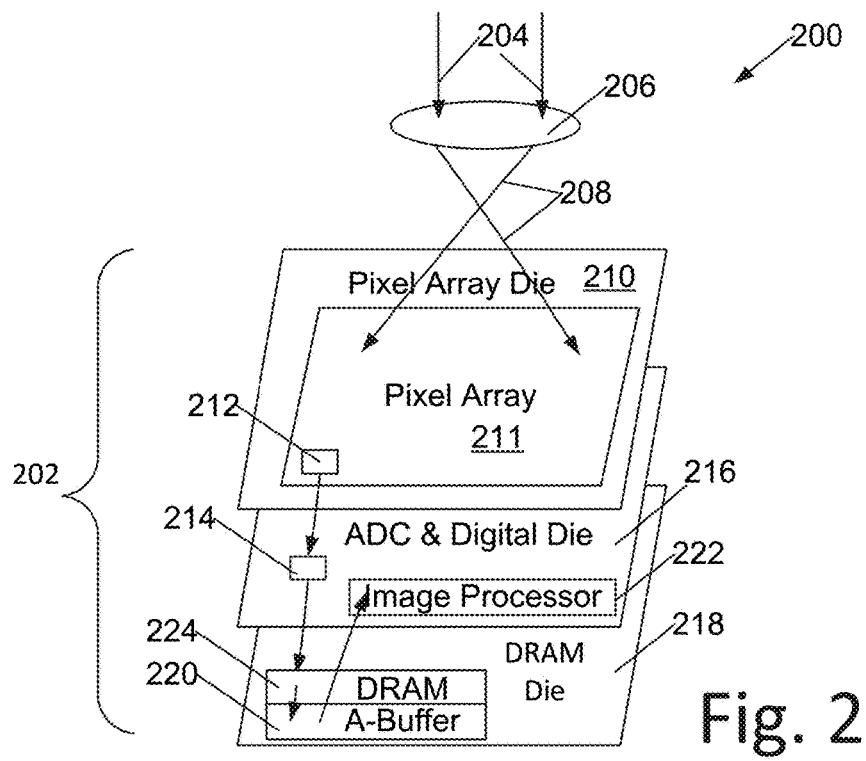
FIG. 2 is a schematic diagram illustrating significant blocks of a camera having a three-wafer bond-per-pixel image sensor showing information flow between die and blocks.

With reference to FIGS. 1 and 2, an electronic camera 200 having a three-wafer, bond-per-pixel image sensor 100, 202 receives incoming light 204 through a lens 206 that focuses light 208 onto a pixel array die 210, or portion of a pixel array wafer, of image sensor 100, 202. This light interacts with photodiodes in blocks 212, 103, 140 of pixels of a pixel array 211 of pixel array die 210, 101. Each block 212, 103, 140 has multiple pixels, while sixteen pixels are illustrated in FIG. 1 for each block for simplicity, in example embodiments pixel counts per block may range from four to one hundred twenty eight, and in a particular embodiment each block has sixty-four pixels. In an embodiment, pixel array die 210, 101 is a backside-illuminated photosensor die including photodiodes and pixel-selection transistors for each pixel within the block, each block having an inter-die bonding pad on a surface of the pixel array die coupled to a separate analog-to-digital converter (ADC) 139, 179, 214 of an ADC and Digital Die 188, 216.

Each ADC 139, 179, 214 of ADC and Digital Die 188, 216 converts signals 190, 192 received from selected pixels of the associated block 212, 103, 140 into digital form, and provides that digital form through through-die vias and inter-die bonding pads 194, 196 to an image DRAM 182, 224 on a DRAM die 198, 218. In embodiments, image DRAM 182, 224s implemented as an image dynamic RAM (DRAM). Image DRAM 182, 224 is sized and configured to hold at least one image as digitized, in one embodiment it holds a single image and in another embodiment it holds a stack of multiple images.

Image DRAM 182, 216 is configured to be read through an alignment buffer 184, 220 of RAM die 198, 218 and inter-die bonding pads coupled to inter-die bonding pads and through-die vias of the ADC and Digital Die 188, 216 to image processor 186, 222 of the ADC and Digital Die 188, 216.

In the sixteen-pixel per pixel block 103, 140 embodiment of FIG. 1, there are many rows and columns of pixel blocks, for example and not limitation a 20-megapixel camera array may have 5120×4096 pixels; in blocks of 16 pixels 1,310,720 blocks in a 1280×1024 array of blocks. In an alternative embodiment using blocks of 64 pixels a similar-sized camera array may have 327,680 blocks in an array of 640×512 blocks.

In the embodiment of FIG. 1, pixels 102, 104, 106, 108 are adjacent pixels in block 103 and in the same row as pixels 142, 144, 146, 148 of block 140. Similarly, pixels 112, 114, 116, 118 are adjacent pixels in block 103 and in the same row as pixels 152, 154, 156, 158 of block 140; pixels 122, 124, 126, 128 are adjacent pixels in block 103 and in the same row as pixels 162, 164, 166, 168 of block 140; and pixels 132, 134, 136, 138 are adjacent pixels in block 103 and in the same row as pixels 172, 174, 176, 178 of block 140.

Because the pixels in each block must be read sequentially through the ADC associated with that block, data from one pixel in each block of a row of blocks is entered into each effective word of the image DRAM 182.

Data from blocks 103, 140 of the pixel array of FIG. 1 lays out in image DRAM 182, Each word of the image DRAM includes ADC results corresponding to pixel data of corresponding pixels in each block 103, 140 of a row 101, 304, 306. In a particular embodiment having an image sensor with 640×512 blocks, 64 pixels per block, having 640 blocks per row, at 12 bits per ADC, the width of writes, or words written, for a single row may be 7680 bits. Since all 512 rows of a frame may write into the image DRAM 182, the image DRAM is written in 64 writes of words of 3,932,160 bits each, with each write including ADC data for a corresponding pixel of each block.

Figure 3:
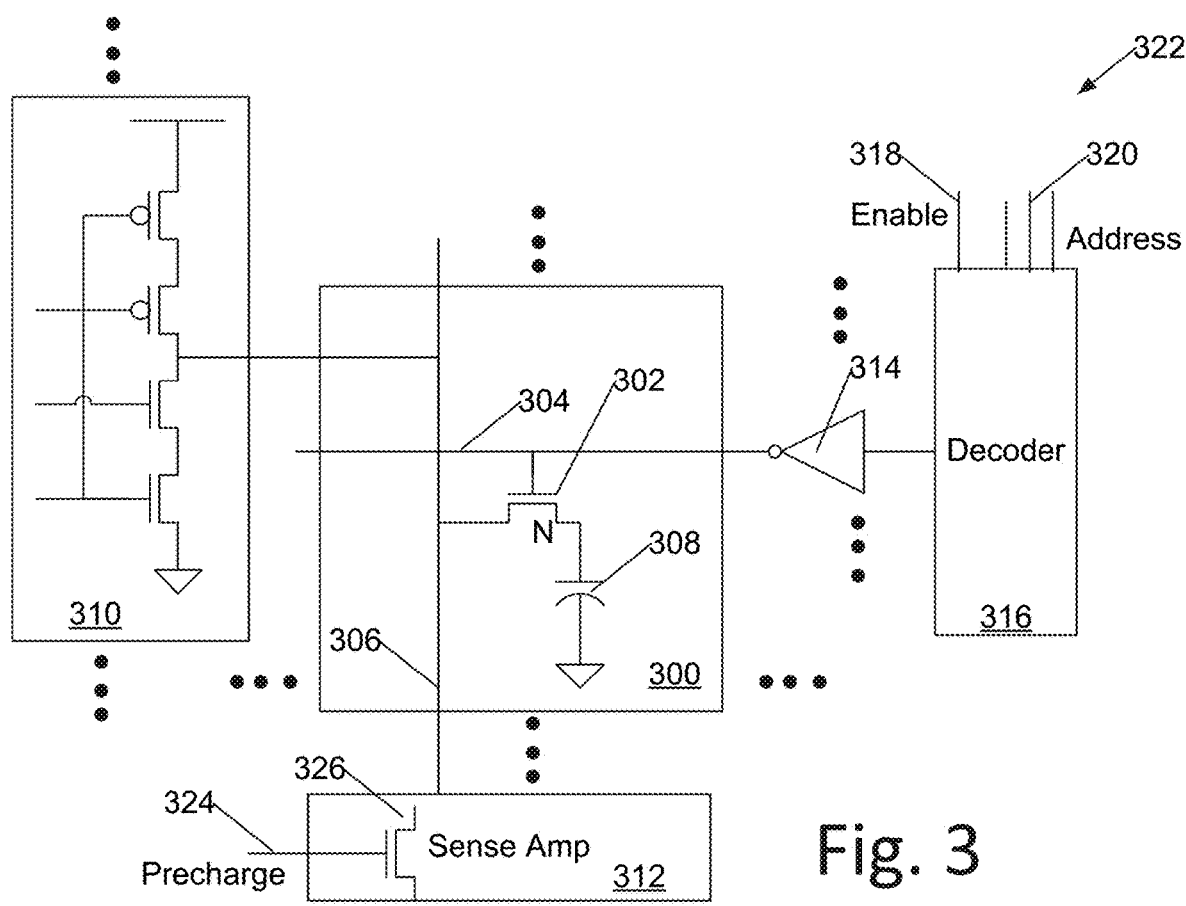
FIG. 3 is a schematic illustration of a DRAM block with write line decoder drivers, write drivers, sense amplifiers, and cell array.

A typical block 322 of DRAM includes an array of single-transistor DRAM bit cells 300, each with a word line 304 controlling a read-write enable transistor 302 that couples a data line 306 to a storage capacitor 380 as illustrated in FIG. 3. Each data line 306 also couples to a data write driver 310 and a sense amplifier 312. Each word line is driven by a word line driver 314 as selected by a word line decoder 316. The word line decoder has an enable control function 318 and decodes an address from an address bus 320. A feedback transistor 326 in each sense amplifier, configured to couple input to output to precharge the data lines, is controlled by a precharge line 324.

DRAM words of 7680 bits, or in the embodiment where all rows of blocks are written at once, hyperlong 4,932,160 bits each, require word lines switch despite enormous gate capacitance. Similarly, precharge of column lines requires switching of lines despite huge capacitance, as does precharging data lines before read or write operations. Switching heavily capacitively-loaded lines causes high surge currents in the lines and drivers, potentially disrupting power voltages throughout the image sensor, because switching the lines requires transferring a charge (in coulombs) of capacitance times the voltage change, and a peak current can be estimated as the number of coulombs divided by the time during which the voltage change takes place. Further, such heavily loaded lines develop significant resistance-capacitance (R-C) delays along the write and precharge lines, potentially impairing circuit function and speed.

In alternative embodiments, hyperlong words of other sizes are used, with one word of each DRAM block being written using staggered word lines activating nearly simultaneously.

Figure 4:
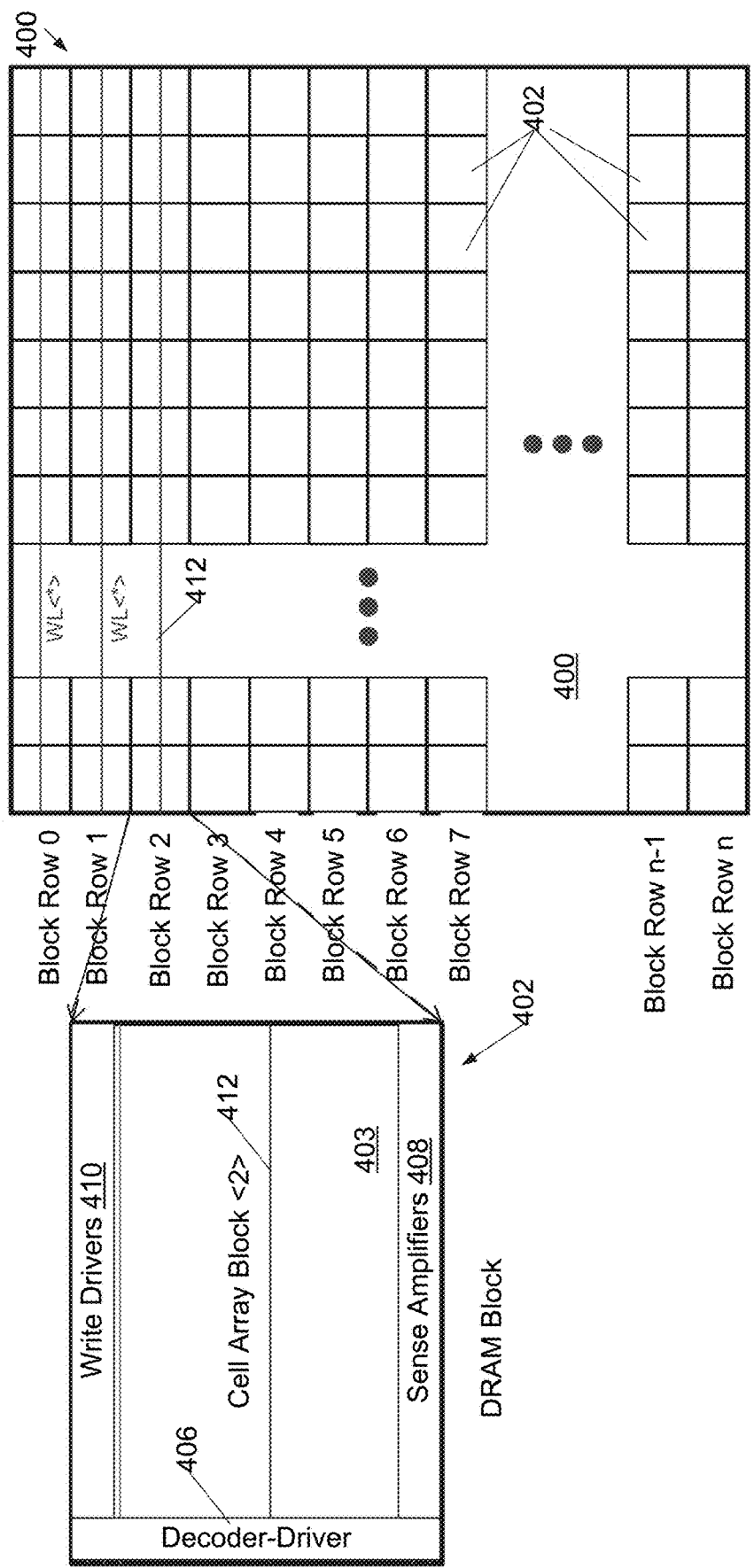
FIG. 4 illustrates a layout of multiple DRAM blocks used to implement an image buffer.

In a typical embodiment, illustrated in FIG. 4, in order to reduce R-C delays along write, precharge, and data lines, the overall image buffer DRAM 400 is divided into multiple blocks of DRAM, such as blocks 402. Each block 402 has an array of cells 403, 300 At least every row of blocks, and in a particular embodiment each block, has a word line decoder and word line driver 406, 314, 316. Each block in a particular embodiment also has sense amplifiers 408, 312 and write drivers 410, 310 as previously discussed with reference to FIG. 3, in a particular embodiment the write drivers are distributed within the array to align with analog-to-digital converters (ADCs) of the logic die of the hybird-bonded image sensor. Corresponding word lines 412, 304 cross each cell array 403 of the blocks.

In embodiments according to the invention, corresponding word lines 412 of blocks 402 are divided into groups; in a particular embodiment word lines of rows of blocks of the array 400 are grouped into a first group of rows of blocks 0, 4, 8, 12, and so on; a second group of rows of blocks 1, 5, 9, 13, and so on; a third group of rows of blocks 2, 6, 10, 14 and so on; and a fourth group of rows of blocks 3, 7, 11, 15 and so on, with the group number equal to the two lowest bits of the row number. In alternative embodiments 8 groups of rows of blocks may be used, with the group number corresponding to the three lowest bits of the row number.

Figure 5:
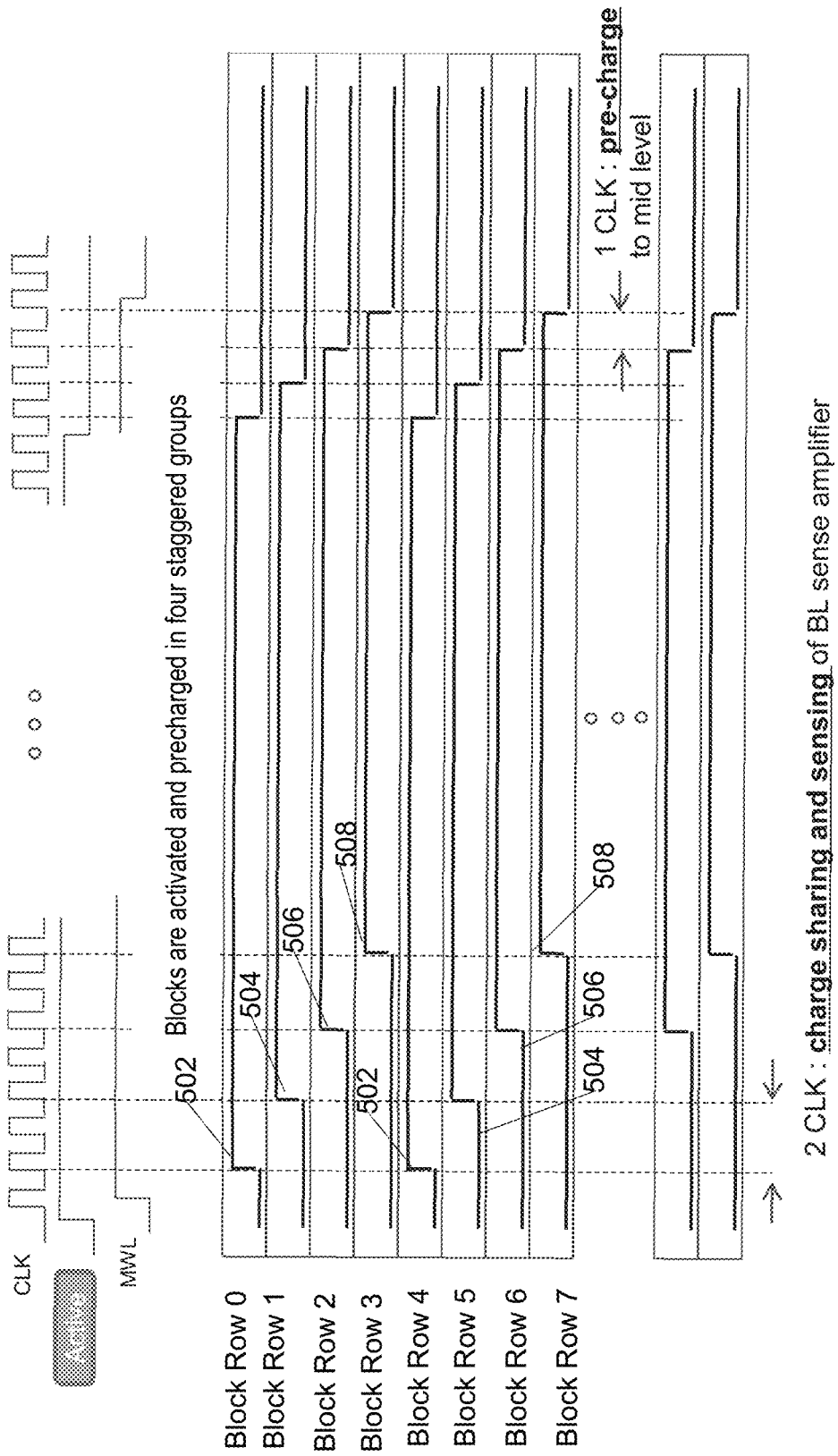
FIGS. 5 and 6 illustrates timing of an embodiment where the image buffer is organized as four groups of DRAM blocks with staggered write and precharge line timing.

The enable lines 318 of all decoders 316 of each group of rows of blocks are tied together, and the enable lines of each group of rows of blocks are staggered, as illustrated for word lines in FIG. 5, where word lines of the first group of rows of blocks have timing 502, the second group of rows of blocks timing 504, the third group of rows of blocks have timing 506, and the fourth group of rows of blocks timing 508. In a particular embodiment, as illustrated in FIG. 5, the leading edges of word lines are staggered by two clock intervals, however the trailing edges are staggered by only one clock interval, so higher-numbered block groups have shorter word line pulses.

Figure 6:
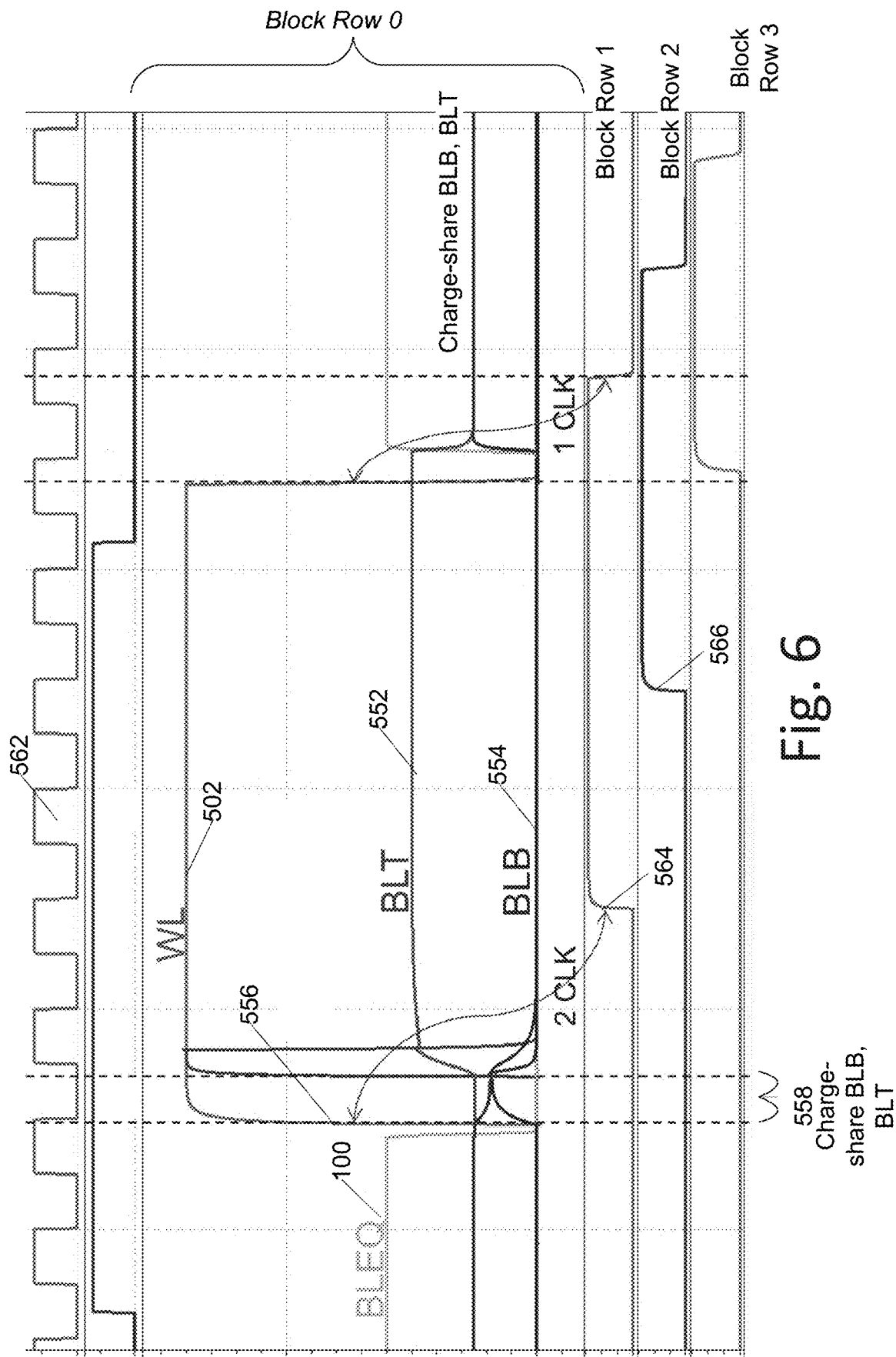

FIG. 6 illustrates timing of blocks in a more detail. First, an address 556 is provided to the word line decoder for a first row of blocks having numbers ending in 00 (binary), and during a precharge or charge-sharing interval 558, true BLT 552 and complement BLB 554 data lines are shorted together to precharge or charge-share the data lines; this erases previous read results 570. Then the word line 502 for the first row of blocks is allowed to rise. After a first delay, in an embodiment two cycles of a clock 562, a different second row of blocks having numbers ending in 01 (binary) has data and complement data lines charge-shared and a word line 564 for that second row of blocks is allowed to rise after first delay from the word line 502 for the first row of blocks. Similarly, after a second delay, in an embodiment two cycles of a clock 562, a different third row of blocks having numbers ending in 10 (binary) is charge shared and a word line 566 for that third row of blocks is allowed to rise after second delay from the word line 564 for the second row of blocks. The entire sequence of staggered writing of the first, second, third, and fourth rows of blocks forming a single hyperlong word is referred herein as single array write cycle.

In alternative embodiments, first and second delays are a single clock cycle. In other alternative embodiments, first and second delays are not determined by clock cycles, but are determined by analog delay circuits. In still other embodiments, first and second delays are an integer number of clock cycles or half clock cycles.

Figure 7:
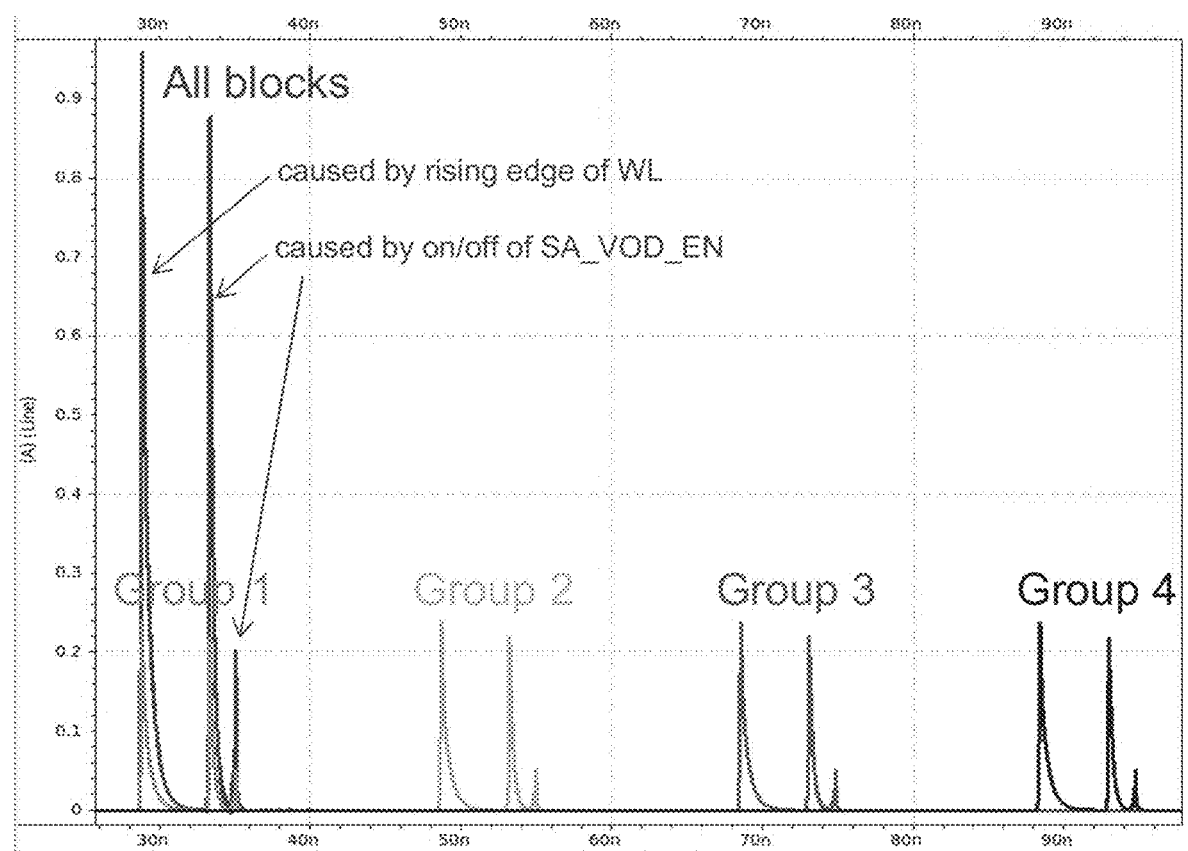
FIG. 7 is a simulation result of word line switching illustrating reduced, and distributed, peak DRAM currents in an embodiment.

As shown in FIG. 7, peak currents induced by word line transitions are significantly reduced by staggering word line transitions.

Figure 8:
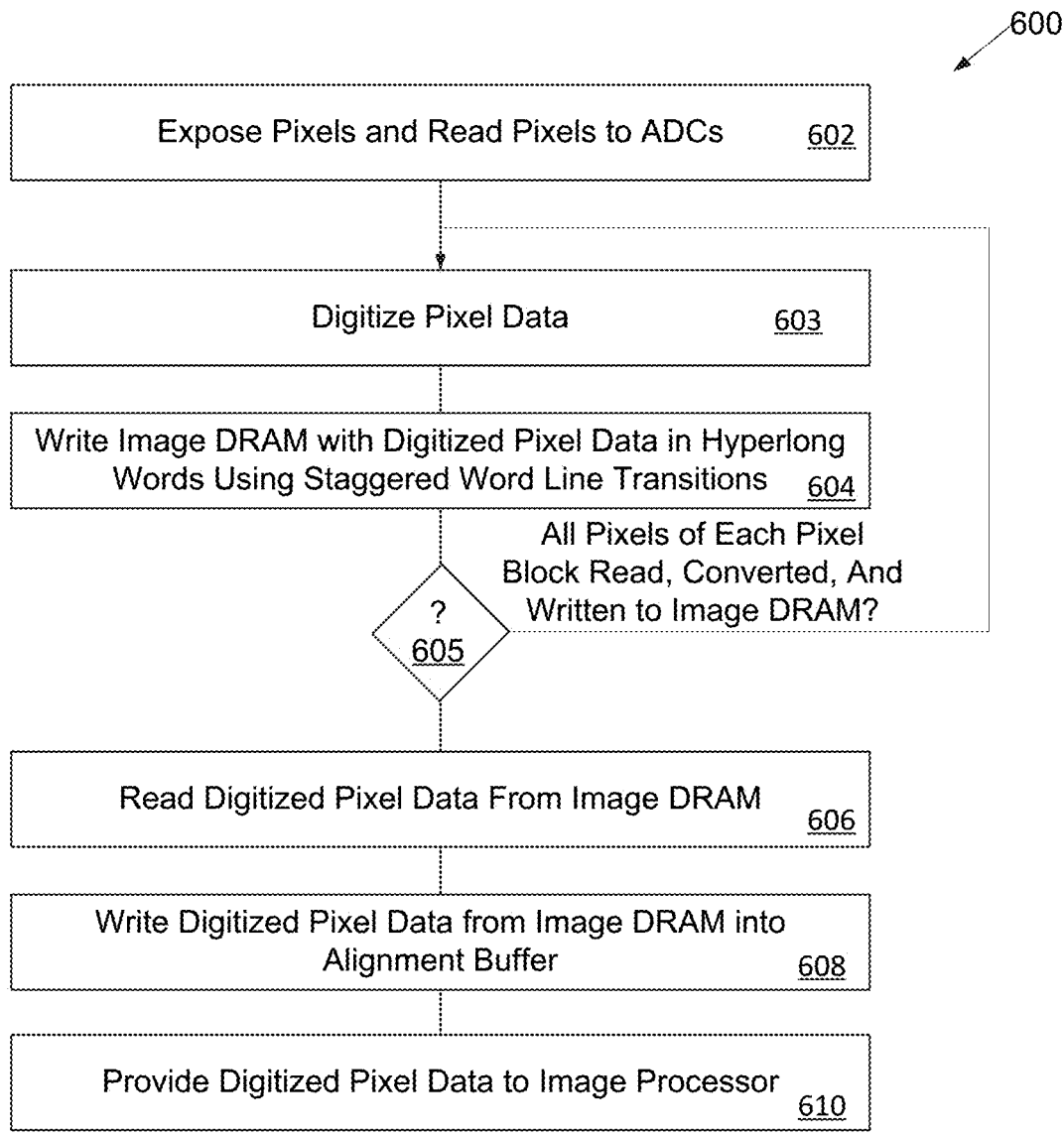
FIG. 8 is a flowchart of operation of the sensor of FIG. 1.

The system essentially operates with the method 600 illustrated in FIG. 8. First, pixels of the photosensor array are reset and exposed 602 to light for a predefined exposure period. Upon completion of the exposure, charge from pixels are read in sequence within each block of pixels, reading one pixel in each block simultaneously and transferring pixel data in analog form across the die boundary from the pixel sensor die to the logic die, into the ADC converter and digitized 603. Digitized pixel data, typically of 12 bits per pixel with alternative embodiments ranging from 8 to 16 bits per pixel, is presented in parallel, one digitized pixel from each pixel block in parallel forming a hyperlong word, to the image DRAM and written 604 to the image DRAM using staggered, overlapping, word lines as discussed with reference to FIGS. 3, 4, 5, and 6. The steps of reading pixel data into the ADC and digitizing 603, and writing 604 the Image DRAM with hyperlong words containing this pixel data are repeated 605 until all pixels of each pixel block have been read, converted, and written to Image DRAM. The Image DRAM is then read 606 line by line, using narrower words than the hyperlong words with which it was written, and digitized pixel data written 608 into the alignment buffer, and digitized pixel data is provided 610 from the alignment buffer to the image processor.

Combinations

It is anticipated that the staggered word lines herein described may be combined with other features herein described in a multitude of ways. Among specific combinations of features using the staggered word lines applicant anticipates include:

An image sensor designated A has an array of pixels configured to sense light and configured in a plurality of blocks where each block of pixels feeds a separate analog-to-digital converter (ADC) to provide digitized image data. The ADCs feed digitized image data into an image dynamic random access memory (DRAM) in hyperlong words, the image DRAM using staggered word lines to write each hyperlong word. The image DRAM provides digitized image data to an alignment buffer that in turn provides digitized image data to an image processor.

An image sensor designated AA including the image sensor designated A wherein the image DRAM is read to the alignment buffer in words narrower than the hyperlong words with which the alignment buffer is written.

An image sensor designated AB including the image sensor designated A or AA wherein a plurality of the staggered word lines have at least one edge delayed by two clock cycles from a preceding one of the staggered word lines within the same array write cycle.

An image sensor designated AC including the image sensor designated A or AA wherein a plurality of the staggered word lines have at least one edge delayed by an analog delay from a preceding one of the staggered word lines.

An image sensor designated AD including the image sensor designated A, AA, AB, or AC wherein the array of pixels is on a pixel sensor integrated circuit die, and the image DRAM is on a second integrated circuit die.

A method designated B of forming a digital image and transferring the digital image to an image processor includes resetting and exposing a photosensor array to light for an exposure period; reading charge from pixels of the photosensor array in sequence within each of a plurality of blocks of pixels, reading charge from one pixel in each block of the plurality of blocks simultaneously; and digitizing the charge from pixels of the photosensor array in a separate analog-to-digital converter (ADC) for each block to provide digitized pixels. The digitized pixels are written as hyperlong words comprising one digitized pixel from each pixel block in parallel into an image DRAM using staggered, overlapping, word lines. Digitized pixels are read from the image DRAM into an alignment buffer; digitized pixels from the alignment buffer are provided to the image processor.

A method designated BA including the method designated B where the step of reading digitized pixels into an alignment buffer uses narrower words than the hyperlong words with which the image DRAM is written.

A method designated BB including the method designated B or BA where charge read from the pixels of the photosensor array is transferred across a die boundary from a pixel sensor die to the ADCs in analog form.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An image sensor comprising:
   an array of pixels configured to sense light and configured in a plurality of blocks;
   where each block of pixels is coupled to a separate analog-to-digital converter (ADC) adapted to provide digitized image data;
   the ADCs being coupled to feed digitized image data into an image dynamic random access memory (DRAM) in hyperlong words, the image DRAM configured to use staggered, overlapping, word lines to write each hyperlong word; and
   the image DRAM being coupled between the ADCs and an alignment buffer to provide digitized image data to the alignment buffer;
   where the alignment buffer is configured to provide digitized image data to an image processor.

2. The image sensor of claim 1 wherein the image DRAM is configured to be read to the alignment buffer in words narrower than the hyperlong words with which the alignment buffer is written.

3. The image sensor of claim 2 wherein a plurality of the staggered word lines have at least one edge delayed by two clock cycles from a preceding one of the staggered word lines in the same array write cycle.

4. The image sensor of claim 2 wherein a plurality of the staggered word lines have at least one edge delayed by an analog delay from a preceding one of the staggered word lines.

5. The image sensor of claim 2 wherein a plurality of the staggered word lines have at least one edge delayed by an integer number of half clock cycles from a preceding one of the staggered word lines in the same array write cycle.

6. The image sensor of claim 3 wherein the array of pixels is on a pixel sensor integrated circuit die, and the image DRAM is on a second integrated circuit die.

7. A method of forming a digital image and transferring the digital image to an image processor comprising:

resetting and exposing a photosensor array to light for an exposure period;

reading charge from pixels of the photosensor array in sequence within each of a plurality of blocks of pixels, reading charge from one pixel in each block of the plurality of blocks simultaneously;

digitizing the charge from pixels of the photosensor array in a separate analog-to-digital converter (ADC) for each block;

writing hyperlong words comprising one digitized pixel from each pixel block in parallel into an image DRAM using staggered, overlapping, word lines;

reading digitized pixels from the image DRAM into an alignment buffer; and providing digitized pixels from the alignment buffer to the image processor.

8. The method of claim 7 where the step of reading digitized pixels into an alignment buffer uses narrower words than the hyperlong words with which the image DRAM is written.

9. The method of claim 8 where charge read from the pixels of the photosensor array is transferred across a die boundary from a pixel sensor die to the ADCs in analog form.

* * * * *